(12) United States Patent
Abbey et al.

(10) Patent No.: US 10,681,898 B2
(45) Date of Patent: Jun. 16, 2020

(54) COLLAPSIBLE BOWL WITH LID CONVERTIBLE TO LEGS

(71) Applicants: Loving Pets Corporation, Cranbury Township, NJ (US); Gravity Product Development, LLC, Golden, CO (US)

(72) Inventors: Eric Abbey, East Brunswick, NJ (US); John James Stone, Golden, CO (US)

( * ) Notice: Subject to any disclaimer, the term of this patent is extended or adjusted under 35 U.S.C. 154(b) by 0 days.

(21) Appl. No.: 15/955,123

(22) Filed: Apr. 17, 2018

(65) Prior Publication Data

US 2018/0228127 A1    Aug. 16, 2018

Related U.S. Application Data

(63) Continuation-in-part of application No. 15/364,750, filed on Nov. 30, 2016, now Pat. No. 10,357,120.

(51) Int. Cl.
| | |
|---|---|
| A01K 5/01 | (2006.01) |
| B65D 43/16 | (2006.01) |
| A47G 19/22 | (2006.01) |
| B65D 43/22 | (2006.01) |
| A47G 19/02 | (2006.01) |
| B65D 51/24 | (2006.01) |
| B65D 21/08 | (2006.01) |

(52) U.S. Cl.
CPC ............ *A01K 5/0114* (2013.01); *A47G 19/02* (2013.01); *A47G 2019/2277* (2013.01); *B65D 21/086* (2013.01); *B65D 43/164* (2013.01); *B65D 43/22* (2013.01); *B65D 51/249* (2013.01)

(58) Field of Classification Search
CPC .................. A01K 5/0114; A47G 19/02; A47G 2019/2277; B65D 51/249; B65D 43/22; B65D 43/164
USPC ................... 220/574, 212, 8, 4.28, 666, 756
See application file for complete search history.

(56) References Cited

U.S. PATENT DOCUMENTS

| | | | | |
|---|---|---|---|---|
| 3,811,718 A | * | 5/1974 | Bates ...................... | E05C 3/045 |
| | | | | 292/241 |
| 4,585,915 A | * | 4/1986 | Moore ............... | B65D 81/3453 |
| | | | | 219/732 |
| 9,616,563 B2 | * | 4/2017 | Vilkormirski .......... | B25H 3/023 |

\* cited by examiner

*Primary Examiner* — King M Chu
*Assistant Examiner* — James M Van Buskirk
(74) *Attorney, Agent, or Firm* — Standley Law Group LLP; James Kwak

(57) ABSTRACT

The present invention is directed to a portable feeding apparatus or bowl, more particularly to a travel feeding apparatus for pets having a hinged lid that converts to legs for supporting the bowl in an upright manner. The hinged lid has a lock for locking the lid in a closed position.

17 Claims, 5 Drawing Sheets

COLLAPSIBLE BOWL WITH LID CONVERTIBLE TO LEGS

CROSS-REFERENCE TO RELATED APPLICATIONS

This application is a continuation-in-part of U.S. application Ser. No. 15/364,750 filed on Nov. 30, 2016 which is herein incorporated by reference in its entirety.

BACKGROUND OF THE INVENTIVE FIELD

The present invention is directed to a portable feeding apparatus or bowl, more particularly to a travel feeding apparatus having a collapsible bowl for food and water. Although collapsible feeding bowls are known in the art, the present invention is novel in that it provides a unique combination of features that provides a portable bowl feeding/drinking apparatus while also allowing for the storage and transport of food and/or water or other liquids. The bowl also has a lid that converts into legs for supporting the bowl in an upright position. The present invention provides for a highly flexible, compactable and convenient apparatus for storing food/liquid, carrying food/liquid, and feeding not previously known in the art.

SUMMARY OF THE GENERAL INVENTIVE CONCEPT

The present invention relates to a portable, traveling feeding apparatus, preferably comprised of a collapsible bowl having an opening and a rim; a lid comprised of a first lid portion and a second lid portion, wherein the first and second lid portions are in a semi-circle shape and wherein the first and second lid portions each have a straight edge; a first hinge for hingably connecting the first lid portion to the bowl; a second hinge for hingably connecting the second lid portion to the bowl; a lock for fastening the first and second lid portions together in a closed position; wherein the first and second lid portions are adapted to act as support stands for the bowl when in the open position; and wherein the collapsible bowl is adapted to be expanded to hold food or water and collapsed to conserve space.

BRIEF DESCRIPTION OF THE DRAWINGS

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
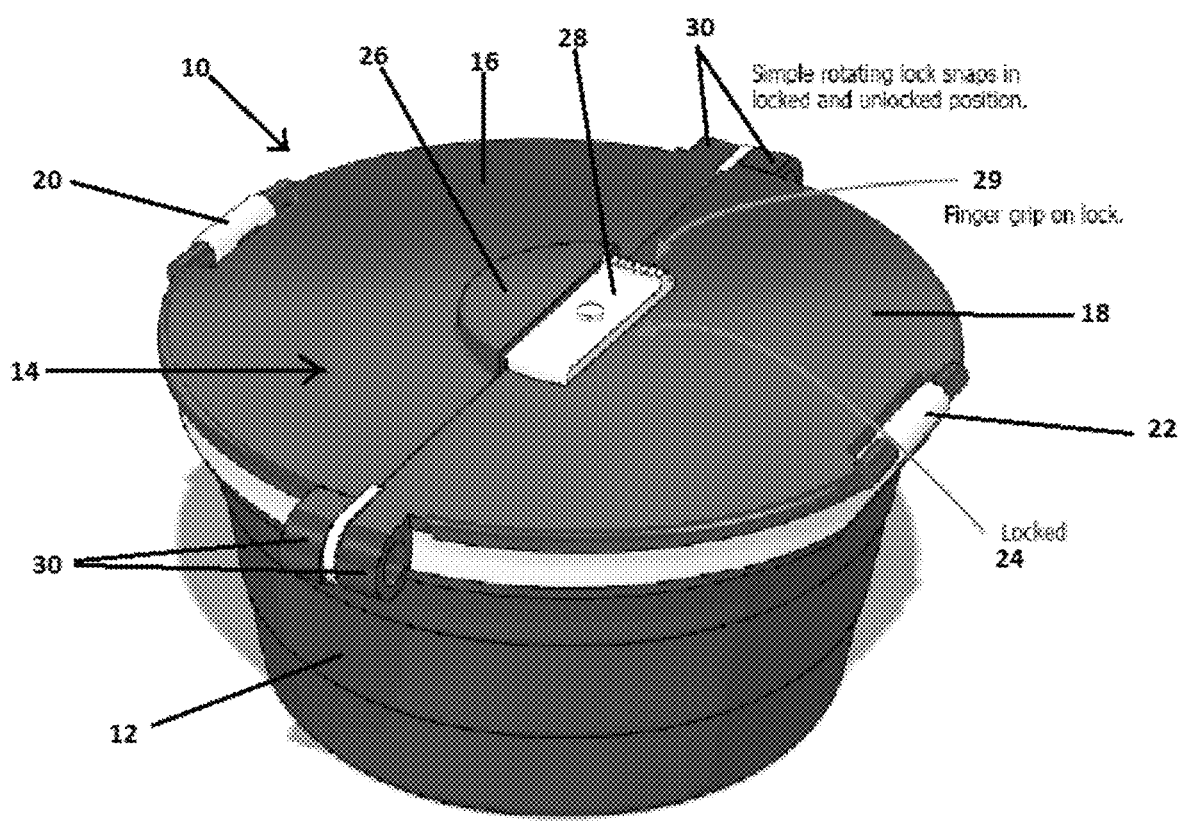
FIG. 1 illustrates one embodiment of the portable feeding bowl of the present invention showing the lock in a locked position.

The present invention relates to a portable, traveling feeding apparatus 10, preferably comprised of a first collapsible bowl 12. FIG. 1 illustrates one embodiment of the portable feeding bowl of the present invention showing the lock in a locked position. The bowl is collapsible into a flat position for easy storage and transport. Collapsible bowls are known in the art. The lid 14 is comprised of a first portion 16 in a semi-circle shape and a second portion 18 also in a semi-circle shape. The first and second lid portions are connected to the rim of the bowl by hinges 20, 22, respectively. The hinges allow the first and second lid portions to open and close, off and on, the opening of the bowl.

In the embodiment of FIG. 1, the lid is comprised of a lock 24 that rotates to lock and unlock the lid. The first portion of the lid has a raised portion 26 in a semi-circle shape for accepting the locking mechanism 28. The locking mechanism has a first end in a semi-circle shape that fits within an opening formed by the raised portion of the lid that locks in place to secure the lid portions together in a locked fashion. The locking mechanism has an opposite end that is straight. When the locking mechanism is rotated around a center fastener or screw, the lock is unlocked allowing the lid portions to open. For example, in the embodiment shown in FIG. 1, when the locking mechanism is rotated in the clockwise direction, the semi-circle end rotates out of the raised portion of the lid and the straight end of the locking mechanism rotates so that the straight end is parallel to the straight edge of the raised portion of the lid (but does not go into the raised portion of the lid). When the locking mechanism is completely out of the raised portion of the lid, the lock is unlocked and the lid portions can be opened for access to the bowl.

Figure 2:
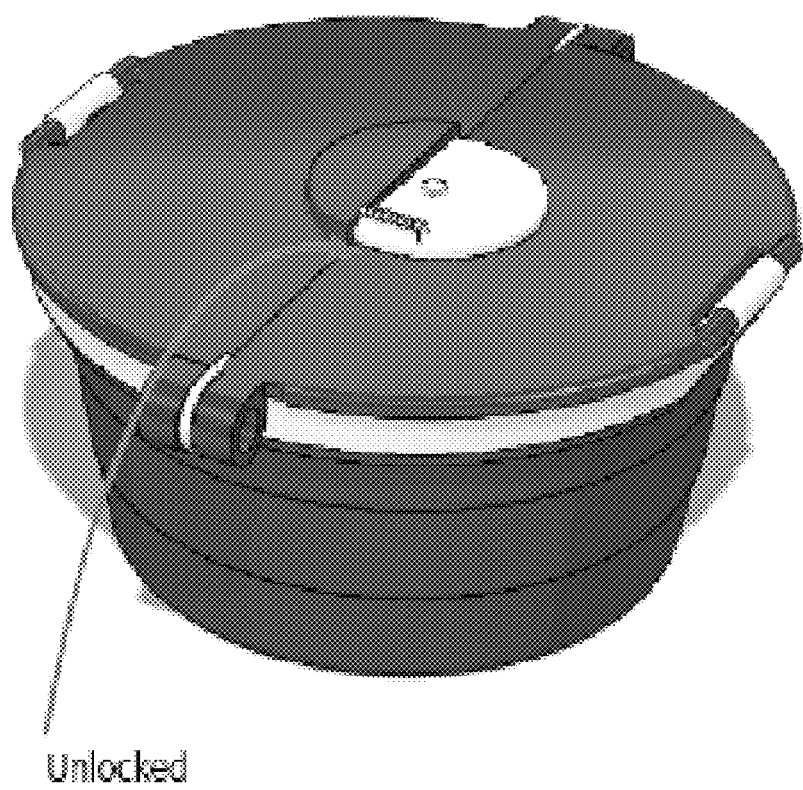
FIG. 2 illustrates the portable feeding bowl of FIG. 1 showing the lock in an unlocked position.

FIG. 2 illustrates the portable feeding bowl of FIG. 1 showing the lock in an unlocked position. The locking mechanism can be rotated in the counter-clockwise direction to relock the bowl. In the embodiment of FIG. 1, the locking mechanism is adapted with a finger grip 29 on one edge to facilitate gripping of the lock with the tip of a finger.

Figure 3:
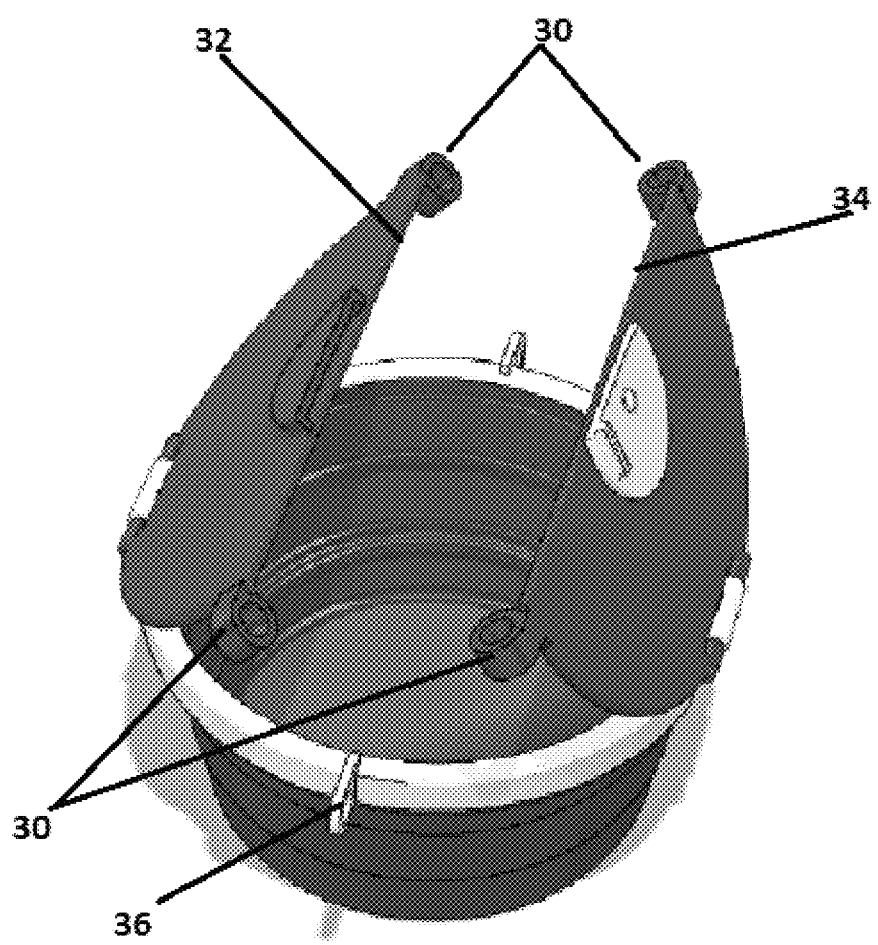
FIG. 3 illustrates the portable feeding bowl of FIG. 1 showing the lid in a semi-open position.
Figure 4:
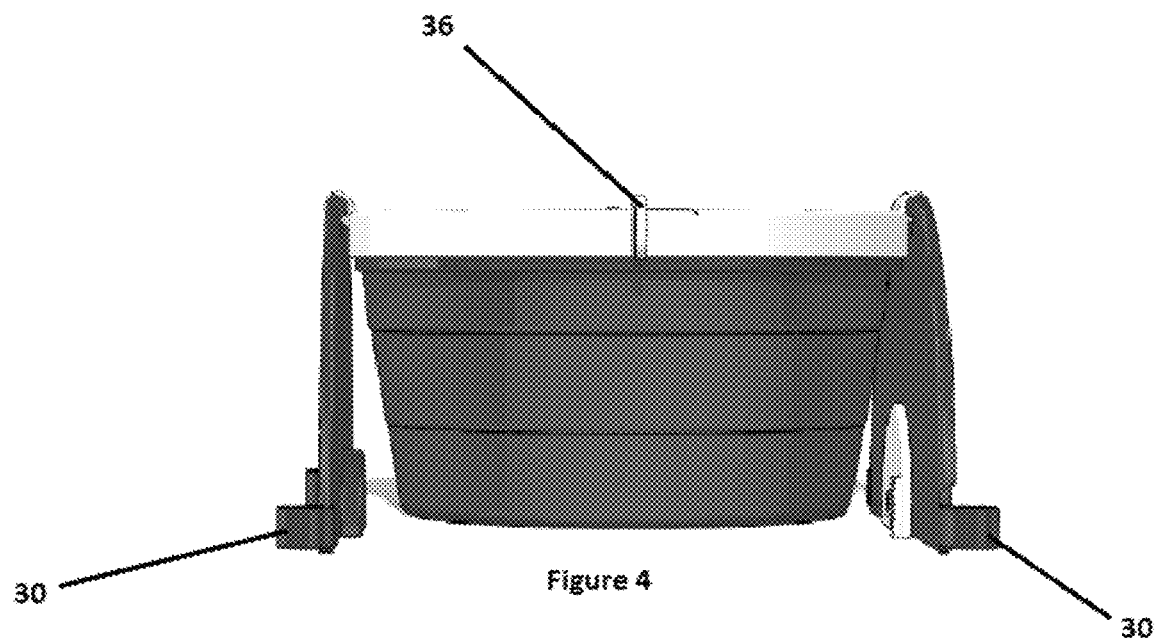
FIG. 4 illustrates the portable feeding bowl of FIG. 1 showing the lid in an open position with the first and second lid portions acting as support stands for the bowl.

The first and second portions of the lid can be opened so that the first and second lid portions act as support stands for the bowl. FIG. 3 illustrates the portable feeding bowl of FIG. 1 showing the lid in a semi-open position. FIG. 4 illustrates the portable feeding bowl of FIG. 1 showing the lid in an open position with the first and second lid portions acting as support stands for the bowl. The first lid portion has two stand portions 30 attached to opposite ends of the straight edge 32 of the first lid portion that act as a support base or feet when the lid portions are in the open position. The second lid portion also has two stand portions 30 attached at the opposite ends of the straight edge 34 of the second lip portion that similarly act as a support base or feet. When in the open position, the first and second lid portions act as support stands to prevent the bowl from tipping over during use.

In the embodiment shown in FIGS. 3 and 4, the stand portions are tubular in shape having hollow openings. The stand portions are preferably attached to the lids so that they hang over the rim of the bowl opening when the lid portions are in the closed position. They are also adapted so the tubular openings of the stand portions on the first and second lid portions mate and align with each other when the lid portions are in the closed position. The radius of the lid is preferably the same length, or approximately the same length, as the height of the bowl when in an uncollapsed state. This allows the lid portions to act as support stands for the bowl.

Figure 5:
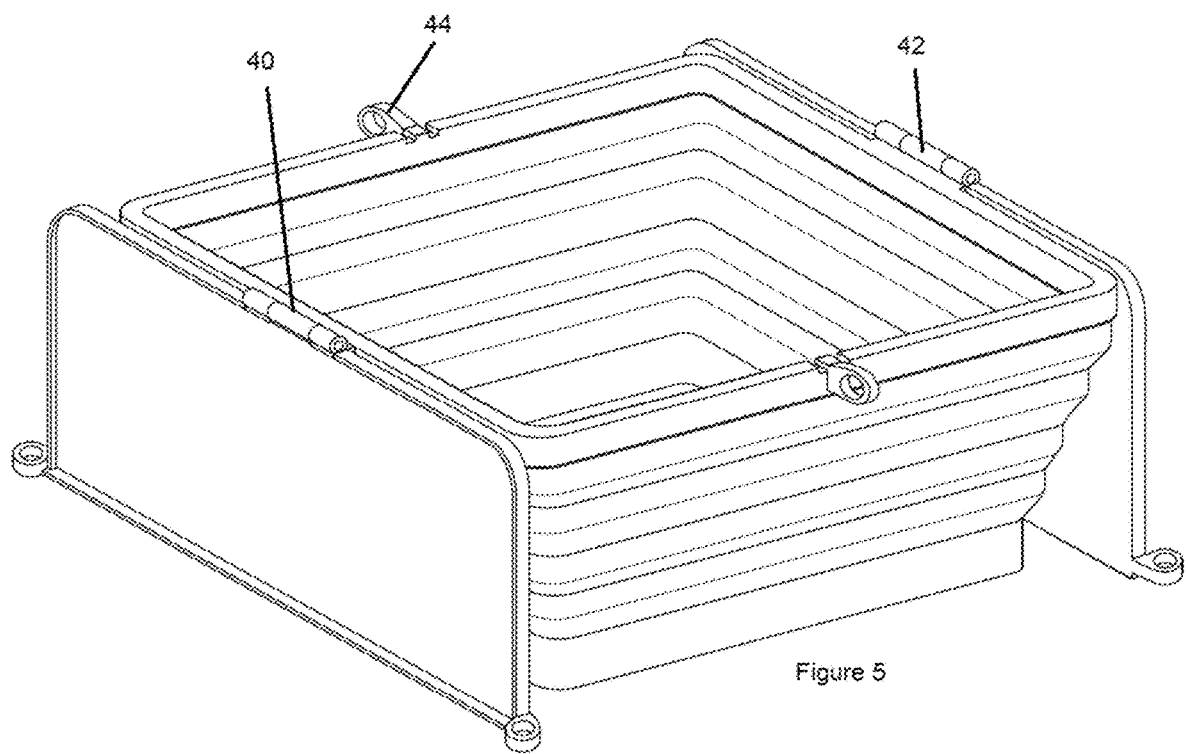
FIG. 5 illustrates another embodiment of the portable feeding apparatus of the present invention.

FIG. 5 illustrates another embodiment of the portable feeding apparatus of the present invention. In this embodiment, the bowl is square shape and the first and second lid portions are symmetrical rectangular shaped portions. Like the bowl of FIG. 1, the first and second lid portions are connected to the rim of the bowl by hinges 40, 42, respectively. The hinges allow the first and second lid portions to open and close, off and on, the opening of the bowl.

In one embodiment of FIG. 5, the lid is comprised of a lock similar to the lock of FIG. 1, that rotates to lock and unlock the lid. Similar to the embodiment of FIG. 1, the first and second portions of the lid can be opened so that the first and second lid portions act as support stands for the bowl. In the preferred embodiment, the bowl of FIG. 5 also has stand portions on the first and second lid portions that act as a support base or feet when the lid portions are in the open position. When the first and second lid portions are in the open position, the first and second lid portions act as support stands to prevent the bowl from tipping over during use. As illustrated in FIGS. 4 and 5, the first and second lid portions, when in this open position, also prevents the bowl from collapsing during use or feeding. The lid portions are preferably comprised of a rigid material that provides support to the collapsible bowl when in the open position. For example, if a pet was eating out of the bowl and pushing down on the bowl portion during feeding, the lid portions will prevent the bowl from collapsing thus preventing spills during use.

The bowl of the FIG. 5 also has a coupling member 44 attached to the bowl having a cut-out hole portion that matches and aligns with the tubular openings in the stand portions. In one embodiment, a carabiner can be used to provide hands-free carrying and a mechanism to lock the lid in the closed position. For example, the carabiner can be placed through the holes in the coupling member and the openings in the stand portions when the lid portions are in the closed position. In an alternate embodiment, the stand portions are square or rectangular in shape and hollow. The coupling member is sandwiched between the two stand portions on each side of the lid when the lid portions are in the closed position.

What is claimed is:

1. A portable feeding apparatus, comprising:
    a collapsible bowl having an opening and a rim;
    a lid comprised of a first lid portion and a second lid portion, wherein the first and second lid portions are symmetrical in shape and wherein the first and second lid portions each have a straight edge;
    a first hinge for hingably connecting the first lid portion to the bowl;
    a second hinge for hingably connecting the second lid portion to the bowl;
    a lock for fastening the first and second lid portions together in a closed position;
    wherein the first and second lid portions are adapted to act as support stands for the bowl when in an open position;
    wherein the first and second lid portions are adapted to prevent the collapsible bowl from collapsing when the first and second lid portions are in the open position and when acting as support stands for the bowl;
    wherein the straight edge of the first lid portion and the straight edge of the second lid portion are disposed adjacent to each other to form the lid to the collapsible bowl when the first and second lid portions are in the closed position and wherein the first lid portion is hingably connected to the bowl so that the straight edge of the first lid portion is disposed adjacent to a surface the bowl is resting on when the first lid portion is in the open position and wherein the second lid portion is hingably connected to the bowl so that the straight edge of the second lid portion is disposed adjacent to the surface the bowl is resting on when the second lid portion is in the open position; and
    wherein the collapsible bowl is adapted to be expanded to hold food or water and collapsed to conserve space.

2. The portable feeding apparatus of claim 1, further comprising:
    a first stand portion attached at one end of the straight edge of the first lid portion;
    a second stand portion attached at the opposite end of the straight edge of the first lid portion;
    a third stand portion attached at one end of the straight edge of the second lid portion;
    a fourth stand portion attached at the opposite end of the straight edge of the second lid portion;
    wherein the first and second stand portions act as a support base when the first lid portion is in the open position; and
    wherein the third and fourth stand portions act as a support base when the second lid portion is in the open position.

3. The portable feeding apparatus of claim 2, wherein the first, second, third and fourth stand portions are tubular in shape with hollow openings;
    wherein the openings of the stand portions on the first and second lid portions mate and align with each other when the lid portions are in the closed position.

4. The portable feeding apparatus of claim 3, further comprising:
    a first coupling member interposed between the first and third stand portions when the first and second lid portions are in the closed position;
    a second coupling member interposed between the second and fourth stand portions when the first and second lid portions are in the closed position;
    and wherein the first coupling member has a cut-out opening that mates and aligns with the first and third stand portions when the first and second lid portions are in the closed position;
    and wherein the second coupling member has a cut-out opening that mates and aligns with the second and fourth stand portions when the first and second lid portions are in the closed position.

5. The portable feeding apparatus of claim 1, wherein the first lid portion is further comprised of a raised portion in a semi-circle shape having an opening, and wherein the lock is comprised of:
    a locking mechanism attached to the second lid portion, the locking mechanism in a semi-circle shape that fits within the opening formed by the raised portion, the locking mechanism having an end that is straight edge;
    wherein the locking mechanism is adapted to rotate to lock the first and second lid portions in the closed position.

6. The portable feeding apparatus of claim 5, wherein the locking mechanism is adapted with a finger grip.

7. A portable feeding apparatus, comprising:
a bowl having an opening and a rim;
a lid comprised of a first lid portion and a second lid portion, wherein the first and second lid portions are each in a rectangular shape and wherein the first and second lid portions each have a straight edge;
a first hinge for hingably connecting the first lid portion to the bowl;
a second hinge for hingably connecting the second lid portion to the bowl;
a lock for fastening the first and second lid portions together in a closed position;
a first stand portion attached at one end of the straight edge of the first lid portion;
a second stand portion attached at the opposite end of the straight edge of the first lid portion;
a third stand portion attached at one end of the straight edge of the second lid portion;
a fourth stand portion attached at the opposite end of the straight edge of the second lid portion;
wherein the first and second stand portions act as a support base when the first lid portion is in an open position;
wherein the third and fourth stand portions act as a support base when the second lid portion is in an open position;
wherein the first and second lid portions are adapted to act as support stands for the bowl when in the open position;
wherein the straight edge of the first lid portion and the straight edge of the second lid portion are disposed adjacent to each other to form the lid to the collapsible bowl when the first and second lid portions are in the closed position and wherein the first lid portion is hingably connected to the bowl so that the straight edge of the first lid portion is disposed adjacent to a surface the bowl is resting on when the first lid portion is in the open position and wherein the second lid portion is hingably connected to the bowl so that the straight edge of the second lid portion is disposed adjacent to the surface the bowl is resting on when the second lid portion is in the open position; and
wherein the first and second lid portions are adapted to prevent the collapsible bowl from collapsing when the first and second lid portions are in the open position and when acting as support stands for the bowl.

8. The portable feeding apparatus of claim 7, wherein the first, second, third and fourth stand portions are tubular in shape with hollow openings;
wherein the openings of the stand portions on the first and second lid portions mate and align with each other when the lid portions are in the closed position.

9. The portable feeding apparatus of claim 8, further comprising:
a first coupling member interposed between the first and third stand portions when the first and second lid portions are in the closed position;
a second coupling member interposed between the second and fourth stand portions when the first and second lid portions are in the closed position;
and wherein the first coupling member has a cut-out opening that mates and aligns with the first and third stand portions when the first and second lid portions are in the closed position;
and wherein the second coupling member has a cut-out opening that mates and aligns with the second and fourth stand portions when the first and second lid portions are in the closed position.

10. The portable feeding apparatus of claim 7, wherein the first lid portion is further comprised of a raised portion in a semi-circle shape having an opening, and wherein the lock is comprised of:
a locking mechanism attached to the second lid portion, the locking mechanism in a semi-circle shape that fits within the opening formed by the raised portion, the locking mechanism having an end that is straight edge;
wherein the locking mechanism is adapted to rotate to lock the first and second lid portions in the closed position.

11. The portable feeding apparatus of claim 10, wherein the locking mechanism is adapted with a finger grip.

12. A portable feeding apparatus, comprising:
a collapsible bowl having an opening and a rim;
a lid comprised of a first lid portion and a second lid portion, wherein the first and second lid portions are symmetrical in shape and wherein the first and second lid portions each have a straight edge;
a first hinge for hingably connecting the first lid portion to the bowl;
a second hinge for hingably connecting the second lid portion to the bowl;
wherein the first and second lid portions are adapted to act as support stands for the bowl when in an open position;
wherein the first and second lid portions are adapted to prevent the collapsible bowl from collapsing when the first and second lid portions are in the open position and when acting as support stands for the bowl;
wherein the straight edge of the first lid portion and the straight edge of the second lid portion are disposed adjacent to each other to form the lid to the collapsible bowl when the first and second lid portions are in the closed position and wherein the first lid portion is hingably connected to the bowl so that the straight edge of the first lid portion is disposed adjacent to a surface the bowl is resting on when the first lid portion is in the open position and wherein the second lid portion is hingably connected to the bowl so that the straight edge of the second lid portion is disposed adjacent to the surface the bowl is resting on when the second lid portion is in the open position; and
wherein the collapsible bowl is adapted to be expanded to hold food or water and collapsed to conserve space.

13. The portable feeding apparatus of claim 12, further comprising:
a first stand portion attached at one end of the straight edge of the first lid portion;
a second stand portion attached at the opposite end of the straight edge of the first lid portion;
a third stand portion attached at one end of the straight edge of the second lid portion;
a fourth stand portion attached at the opposite end of the straight edge of the second lid portion;
and wherein the first and second stand portions act as a support base when the first lid portion is in the open position;
and wherein the third and fourth stand portions act as a support base when the second lid portion is in the open position.

14. The portable feeding apparatus of claim 13, wherein the first, second, third and fourth stand portions are tubular in shape with hollow openings;
- wherein the openings of the stand portions on the first and second lid portions mate and align with each other when the lid portions are in a closed position.

15. The portable feeding apparatus of claim 14, further comprising:
- a first coupling member interposed between the first and third stand portions when the first and second lid portions are in the closed position;
- a second coupling member interposed between the second and fourth stand portions when the first and second lid portions are in the closed position;
- and wherein the first coupling member has a cut-out opening that mates and aligns with the first and third stand portions when the first and second lid portions are in the closed position;
- and wherein the second coupling member has a cut-out opening that mates and aligns with the second and fourth stand portions when the first and second lid portions are in the closed position.

16. The portable feeding apparatus of claim 12, wherein the first lid portion is further comprised of a lock for fastening the first and second lid portions together in a closed position;
- a raised portion in a semi-circle shape having an opening; and
- wherein the lock is comprised of: a locking mechanism attached to the second lid portion, the locking mechanism in a semi-circle shape that fits within the opening formed by the raised portion, the locking mechanism having an end that is straight edge;
- wherein the locking mechanism is adapted to rotate to lock the first and second lid portions in the closed position.

17. The portable feeding apparatus of claim 16, wherein the locking mechanism is adapted with a finger grip.

* * * * *